United States Patent [19]

Auman et al.

[11] Patent Number: 4,586,584
[45] Date of Patent: May 6, 1986

[54] TRUCK BRAKE CONTROL SYSTEM

[75] Inventors: John T. Auman, Washington; Robert R. Luyckx, Troy; Harmahendar Singh, Sterling Heights; Thomas W. Stockton, Ann Arbor, all of Mich.

[73] Assignee: General Motors Corporation, Detroit, Mich.

[21] Appl. No.: 720,873

[22] Filed: Apr. 8, 1985

[51] Int. Cl.$^4$ .......................... B60D 1/12; B60K 28/00
[52] U.S. Cl. ........................................ 180/271; 180/90; 303/3; 303/7; 303/9; 303/13
[58] Field of Search .................... 180/271, 90; 303/3, 303/15, 13, 9, 7, 71, 1, 6, 16–17, 18–20, 86; 188/170, 3 R, 382

[56] References Cited

U.S. PATENT DOCUMENTS

| | | | |
|---|---|---|---|
| 3,992,064 | 11/1976 | Carton et al. | 303/7 |
| 4,023,864 | 5/1977 | Lang et al. | 303/7 X |
| 4,131,173 | 12/1978 | Boersma | 180/90 |
| 4,163,586 | 8/1979 | Snyder | 303/7 X |
| 4,164,987 | 8/1979 | Lagarde | 180/271 |
| 4,210,368 | 7/1980 | Sontheimer | 303/7 X |
| 4,307,917 | 12/1981 | Hasselbacher et al. | 303/71 |
| 4,428,620 | 1/1984 | Warwick et al. | 303/9 X |
| 4,496,193 | 1/1985 | Rumsey | 303/19 |

Primary Examiner—Douglas C. Butler
Attorney, Agent, or Firm—D. D. McGraw

[57] ABSTRACT

An air brake system for a truck in which various control valves controlling air supply to air sub-systems, parking and trailer brakes, and various brake system condition signal generators are mounted on a common manifold positioned remotely from the truck engine compartment and instrument panel, removing them from the instrument panel area and improving the plumbing arrangements for installation, diagnostics and servicing while clearing instrument panel space for other controls and devices which need the benign environment such as that in the truck cab provided for the truck driver. The system components may be used as needed for a straight truck or one composed of a tractor and trailer combination, or on a truck tractor adapted to tow a trailer.

3 Claims, 4 Drawing Figures

TRUCK BRAKE CONTROL SYSTEM

The invention relates to a truck air brake control system and more particularly to systems that may be used in a straight truck or a truck which includes a tractor towing, or at least capable of towing, a trailer.

Future heavy and medium duty trucks are expected to be equipped with computer controlled engines and transmissions, electronic instrument clusters, and on-board body computers to provide improved fuel efficiency and on-board diagnostics for numerous vehicle components. It is expected that many of the electronic control modules will be located in the instrument panel area and will be mounted to the truck cab body structure in order to protect those modules from the temperature, noise and electro-magnetic interference effects of the engine compartment and the vibration effects of the chassis. This requires that space be provided under the instrument panel for these electronic components, and that the brake system be arranged to simplify installation, serviceability and maintanence.

Heavy and medium duty trucks in current production have brake control systems using air brakes which have fully pneumatic controls. These controls are mounted in the tractor cab, with most of them behind the instrument panel. These pneumatic controls, by way of example, include the tractor park control, the trailer service air control, and the entire brake system park control. Other controls, for example the service application valve, are mounted at various points throughout the vehicle. Such an arrangement has numerous air lines running through the tractor dash into the cab and results in several concerns. Such arrangements are labor intensive, particularly for air line installation. This requires considerable skill to properly plumb the system, and particularly in the handling of the plastic tubing involved. The plastic tubings used behind the instrument panel are quite stiff and, due to large bend radii, consume a great deal of space. This limits the size and number of electronic devices that could be installed there. Numerous air lines and connections throughout the vehicle also create opportunities for air leaks which can occur when the lines are serviced or installed. The mass of air lines also limits accessibility behind or under the instrument panel, creating serviceability problems.

It is an object of the invention to accommodate electronic instrument clusters and provide space in a benign environment for engine and transmission control modules on future high technology trucks by increasing the space available behind the instrument panel of air brake system trucks.

It is another object of the invention to reduce the amount of labor required to plumb and install piping and other controls in trucks having air brake systems.

It is another object of the invention to reduce the number of air lines and connections in such systems to reduce air leakage opportunity.

It is another object of the invention to improve the accessibility and serviceability of devices usually positioned behind or under the instrument panel in truck tractors having air brake systems.

Instrument panel mounted electrical and pneumatic controls and a floor mounted service brake application valve, usually controlled by the foot of the vehicle operator, all acting on a remotely located pneumatic and electro-pneumatic controller, are provided. The system provides uniformity and flexibility across product lines.

IN THE DRAWINGS

Figure 1:
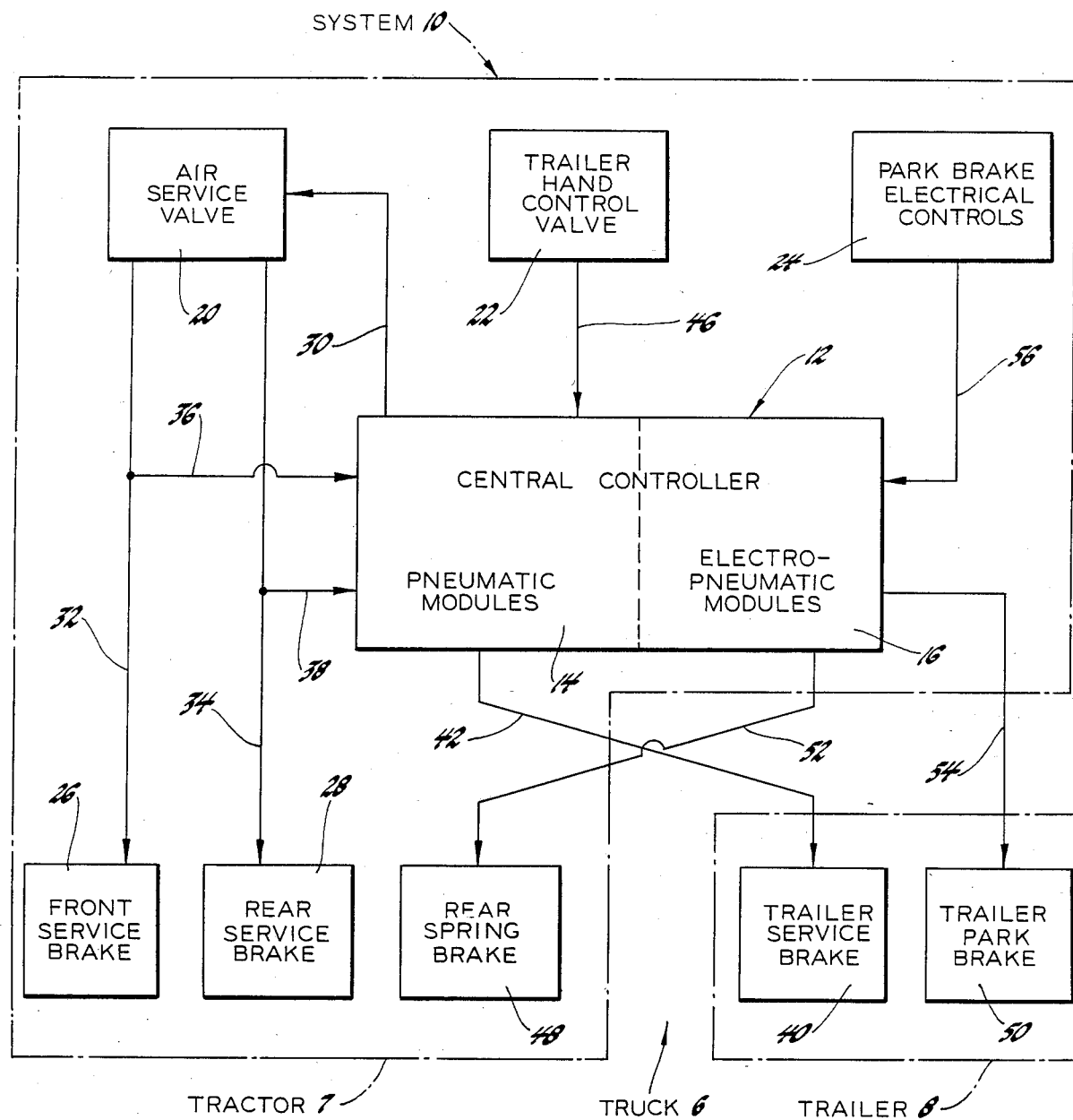
FIG. 1 is a block diagram showing an air brake control system embodying the invention and installed in a tractor-trailer truck.

The brake control system 10 schematically illustrated in block diagram form in FIG. 1 shows the system installed in a truck 6 which comprises a tractor 7 and a trailer 8 towed by the tractor. In referring to trucks, it is to be understood that the truck 6 may be either a straight truck, in which the cargo area is mounted on the same chassis as the cab, or a tractor 7 and trailer 8 in which the tractor incorporates the engine and cab and tows one or more trailers.

System 10 includes a central controller 12 comprising a pneumatic module section 14 and an electro-pneumatic module section 16. The system includes an air brake service application valve 20, a trailer brake hand control valve 22, and electrical parking brake controls 24. The pneumatic module section 14 of the central controller 12 delivers air to the front and rear service brakes 26 and 28 of the truck tractor 7 through use of appropriate air lines 30, 32, 34, 36 and 38, and to the service brakes 40 of trailer 8 through air line 42, as dictated by the vehicle operator when operating the service application valve 20. The trailer service brakes 40 are also controllable through the trailer brake hand control valve 22 and the air line 46 connecting the hand control 22 valve to the module section 14 of central controller 12. All of the circuits of the service brake system remain entirely pneumatic. Only the parking brakes, which include the tractor rear spring brakes 48 and the trailer parking brakes 50, are controlled through the electro-pneumatic module section 16 of the central controller 12 via air lines 52 and 54. The parking brake electrical controls 24 are connected to the electro-pneumatic module section 16 by appropriate electrical leads schmatically illustrated in FIG. 1 as lead 56. Any malfunction in the electrical circuitry has no effect on the operation of the service brake controls.

The arrangement of this system in a tractor-trailer truck would have the trailer and tractor parking controls, which are electric switches, mounted on the tractor instrument panel in the cab. The service application valve 20 would be mounted on the floor as is currently the practice in production systems. The central controller 12, which includes the pneumatic and electro-pneumatic modules sections 14 and 16, which are mounted on a common manifold forming a part of controller 12, is mounted at a convenient location outside the truck or tractor cab area.

All of the brake control functions in current production vehicles that are now performed by the various valves located at the dash and instrument panel areas are performed in this system by the control modules located at a remote area in relation to the dash and instrument panel areas. This substantially reduces the interconnecting plumbing between the valves. Through consolidation of the valves and reduced plumbing, the brake control system embodying the invention reduces assembly cost of the brake system. The number of parts required for the system is reduced. The area under the instrument panel is cleared of several interconnecting air lines and becomes available for other electronic components to be used in the vehicle. The ability to provide diagnostic function capability on the various valves is improved by consolidation into a central controller located at a suitable remote location where the controller is readily available for diagnostic connection and maintenance.

Figure 2:
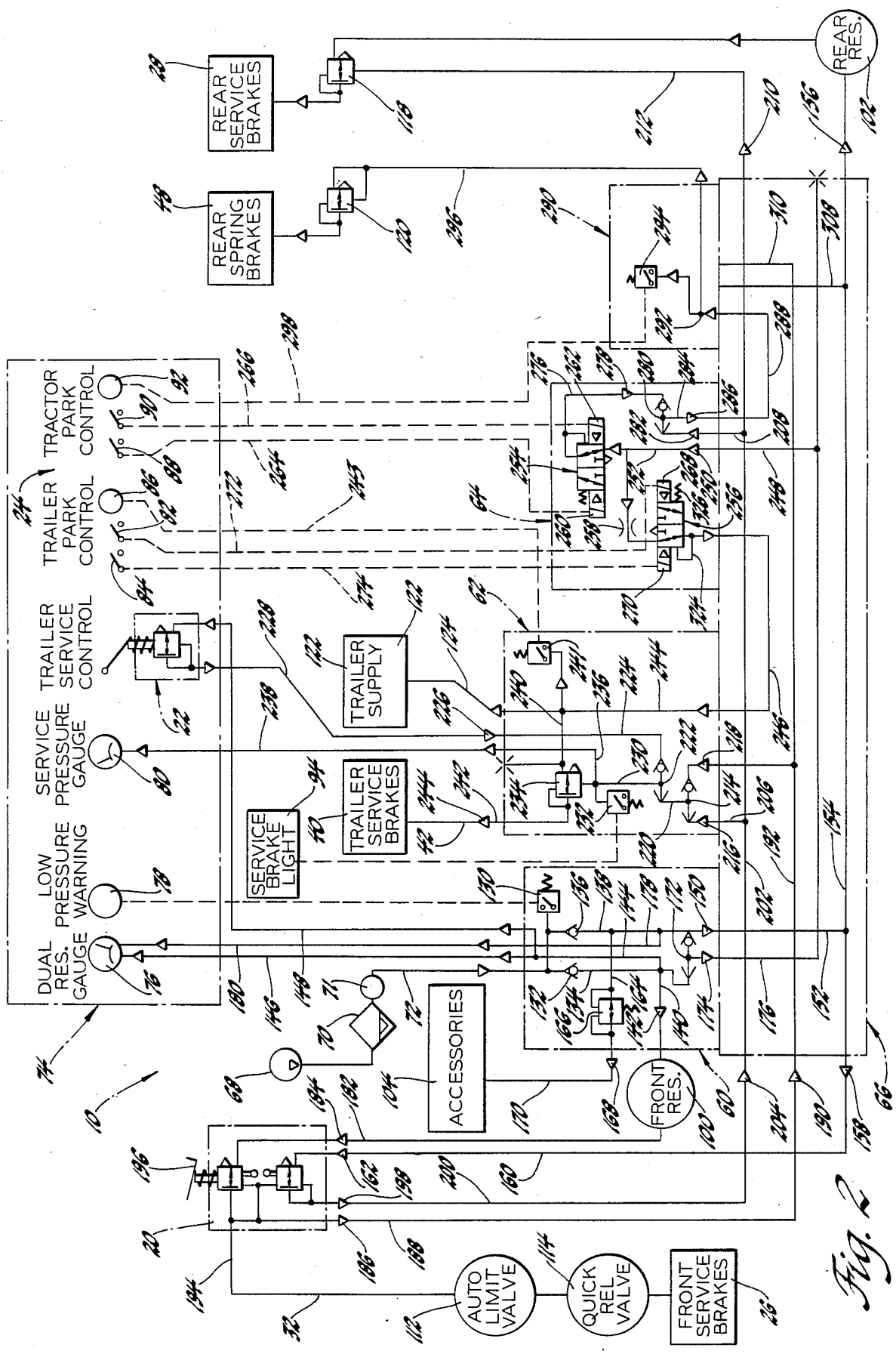
FIG. 2 is a schematic drawing showing the brake control functions and their operation for a truck tractor equipped to tow a trailer.

One arrangement of the brake control system embodying the invention is illustrated in greater detail in FIG. 2, which shows a brake system in a truck tractor equipped to tow a trailer. The central controller 12 includes pneumatic valve modules which form the pneumatic module section 14 of the block diagram of FIG. 1. These modules include the supply valve module 60 and the trailer valve module 62. The park valve module 64 is an electro-pneumatic module forming the module section 16 of the central controller 12 as shown in the block diagram of FIG. 1. Modules 60, 62 and 64 are mounted on a common manifold 66 that supports and provides all of the air interconnections for various valve modules in the controller. It is also plumbed via various air lines to other valves on the vehicle.

The supply valve module 60 receives pressurized air from the compressor 68, after the air has been passed through air dryer 70 and/or wet tank 71, and distributes the air to the various portions of the brake system 10 and also to the air operated accessories 104. Module 60 also isolates the front reservoir 100, the rear reservoir 102 and the accessories 104 from each other so that pressure loss in one of them will not disable the others.

In normal operation, pressurized air from the compressor 68 is passed through air dryer 70 and/or wet tank 71 and then transmitted through air line 72 to the low pressure warning switch 130. Switch 130 is a normally closed switch which opens in response to air pressure when the pressure supplied to the switch reaches a value of approximately 60 p.s.i. Until this pressure is reached, the low pressure warning lamp 78 is energized, providing a readily visible warning on the instrument panel 74 to the vehicle operator. After the pressure supplied by compressor 68 reaches the set minimum value, switch 130 opens and lamp 78 is deenergized. This indicates to the vehicle operator that there is now sufficient air pressure to operate the brake system. Pressurized air also passes through check valve 132 in air passage 134 connected with air line 72 and through check valve 136 in air passage 138 also connected with air line 72. Air passage 134 is connected to air passage 140 which is in turn connected through connector 142 to the front air reservoir 100. The pressurized air in reservoir 100 is also connected to one side of dual reservoir gauge 76 through passage 144 and air line 146. Air line 148 is also connected to air passage 144 of module 60 and leads to the trailer hand control valve 22 mounted on the instrument panel 74. Passage 138 is connected through connector 150 to manifold passage 152 in manifold 66. Passage 152 intersects and connects with manifold passage 154. It should be recognized that manifold 66 is provided with various air passages formed therein by drilling or other suitable means, with the ends of the passages which open out of the manifold body being provided with suitable connectors so that the various air passages and lines of the modules and other portions of the brake system may be connected to the appropriate manifold passages. Any air passage in manifold 66 opening to the exterior and not being used in a particular installation is closed off. Some passages provided for diagnostic connection purposes fall into this category. Manifold passage 154 is connected through connector 156 to the rear air reservoir 102. It is also connected through connector 158 to air line 160, which is connected to the service application valve 20 through connector 162. Passage 164 in supply valve module 60 is connected to passage 138 and through pressure protection valve 166 and connector 168 to air line 170, which in turn is connected to the air operated accessories 104. Passages 134 and 138 are connected to opposite ends of the double check valve 172 in module 60 and the output of the double check valve is connected through connector 174 to manifold passage 176. Passage 176 is the supply pressure passage within manifold 66. Double check valve 172, as well as the other double check valves shown in the drawings, functions as a shuttle valve with the higher pressure one of two pressure inputs connected to the output. The double check valve 172 selects the higher pressure from the two air reservoirs 100 and 102 and delivers that higher pressure to the supply passage 176. Passage 138 is also connected to passage 178 in module 60 which is connected to air line 180 leading to the other side of the dual reservoir pressure gauge 76 on the instrument panel 74. Thus gauge 76 receives pressure from the front reservoir 100 and from the rear reservoir 102 and compares these pressures. If one reservoir suffers a pressure loss, it is immediately indicated by gauge 76.

Pressurized air from the front reservoir 100 is connected through air line 182 and connector 184 to the service application valve 20. Valve connector 186 connects one output of valve 20 through air line 188 to connector 190 and manifold passage 192. Thus passage 192 is provided with front service brake air pressure when the service application 20 is actuated. This pressure is also provided to the front service brakes 26 from valve 20 through air lines 194 and 32 via automatic limiting valve 112 and quick release valve 114 to actuate the front service brakes 26 under control of the valve 20 by the vehicle operator. Valve 20 is normally positioned so as to be actuated by the vehicle operator through the treadle 196 and is a service application valve of the type in common usage in production trucks. The rear service brake pressure output from service application valve 20 passes from that valve through connector 198 and air line 200 to manifold passage 202 via connector 204. Passage 202 has a branch passage 206 connected to the trailer valve module 62, described below, and a branch passage 208 connected to the park valve module 64, also described below. Passage 202 is connected through outlet connector 210 to air line 212 leading to relay valve 118.

The trailer valve module 62 has a double check valve 214 with one side thereof connected through connector 216 to branch passage 206 and receiving rear service brake application pressure from manifold passage 202. The other side of double check valve 214 is connected through connector 218 to manifold passage 192 and receives front brake service application air pressure. The output 220 of double check valve 214 is connected to one side of another double check valve 222. The other side of double check valve 222 is connected via passage 224, connector 226 and air line 228 to the output side of the trailer hand control valve 22 mounted on the instrument panel 74. Double check valve 214 compares the front and rear service application air pressures and delivers the higher of these two pressures through its outlet 220 to one side of double check valve 222. Double check valve 222 selects the higher one of this pressure and the output pressure from the trailer hand control valve 22 and delivers this selected pressure through the passage 230 to the normally open service brake light switch 232, the control side of relay valve 234, and to passage 236, which is connected through air line 238 to service pressure gauge 80 on instrument panel 74. Switch 232 is closed by this pressure, energizing service brake light 94 and indicating to the vehicle operator that service air brake pressure is being delivered to the trailer service brakes 40. Relay valve 234 is supplied with air pressure by the trailer supply circuit passage 240 and delivers pressurized air through passage 242 and connector 244 to air line 42 of the trailer service brakes 40. The pressurized air so delivered to the trailer service brakes 40 is in proportion to the output pressure in output 230 of double check valve 222. The trailer supply pressure in passage 240 is provided through passage 244, which is connected to manifold passage 246. Trailer air supply pressure in passage 240 is also connected to normally closed switch 241, holding that switch open. As discussed below with regard to trailer parking brake operation the pressure in passage 240 may be eliminated; this allows switch 241 to close and energize trailer park indicating lamp 86 through electrical lead 243. As will be discussed below with regard to the park brake valve module 64, the trailer air supply circuit 122 is provided with air pressure via air line 124 and passage 244 from manifold passage 246 and valving within the valve module 64.

The park valve module 64 is operated by separate parking brake controls generally identified by reference numeral 24 and comprising the tractor park control and the trailer park control. Both of these controls are momentary since the valves in modules 64 on which they operate become pneumatically stable soon after shifting to a new state. This makes the valves insensitive to electrical power failure since the valves will not change position or state because of the loss of electrical power. Supply pressure from manifold passage 176 is supplied to valve module 64 through branch manifold passage 248 and connector 250 leading to module passage 252. As noted earlier, the supply pressure in manifold passage 176 is the higher of the front and rear reservoir air pressures.

Valve module 64 includes a tractor park valve 254 connected to receive air pressure from passage 252 and a trailer park valve 256 also connected to receive air pressure from passage 252 through a choke or restrictor 258 at the inlet of valve 256. Tractor park valve 254 has solenoid operators 260 and 262, with solenoid operator 260 being connected through electrical lead 264 to the momentary "on" switch 88 of the tractor park control on instrument panel 74. Solenoid operator 262 is connected by electrical lead 266 to the momentary "off" switch 90 of the tractor park control. When the appropriate switch is closed, the solenoid operator electrically connected thereto shifts the valve 254 from one of its pneumatically stable positions to the other of its pneumatic stable positions. The switches, being momentary, then return to their normally open positions. Similarly, trailer park valve 256 is provided with solenoid operators 268 and 270 which are respectively connected by electrical leads 272 and 274 to the trailer park control momentary "on" switch 82 and the trailer park control momentary "off" switch 84 on the instrument panel 74. Valve 256 is positioned in one of two pneumatically stable positions depending upon which switch 82 or 84 has been momentarily closed to energize the appropriate solenoid operator to move the valve from one such position to the other such position.

The output passage 276 of valve 254 is connected through connector 278 to one side of double check valve 280. The other side of double check valve 280 is connected through connector 282 with branch passage 208 of manifold passage 202 described above. Double check valve 280 selects the higher pressure supplied thereto and transmits the higher pressure through its output 284 and connector 286 to the manifold passage 288.

In the system of FIG. 2, a spring brake module 290 is mounted on manifold 66 and is connected to receive pressure from manifold passage 288. This pressure is received in module passage 292. Passage 292 is connected to the park signal switch 294 and also to the air line 296 leading to relay valve 120 for the rear spring brakes 48. Park signal switch 294 is a normally closed switch which is held open by pressure in passage 292. When that pressure is exhausted, the switch energizes the park control indicating lamp 92 on instrument panel 74 through electrical lead 298. When the trailer park switch 82 is momentarily closed to energize solenoid operator 268, the trailer park valve 256 is moved to exhaust the trailer supply circuit 122, causing the trailer parking brakes to be spring applied since they were normally held off by trailer supply pressure.

By turning the tractor park brakes off through momentary closure of switch 90, and turning the trailer park brake on through momentary closure of switch 82, the trailer parking brakes are applied but the tractor parking brakes are not applied. This condition will allow the vehicle operator to test the fifth wheel connection between the tractor and trailer by trying to move the entire truck.

Figure 3:
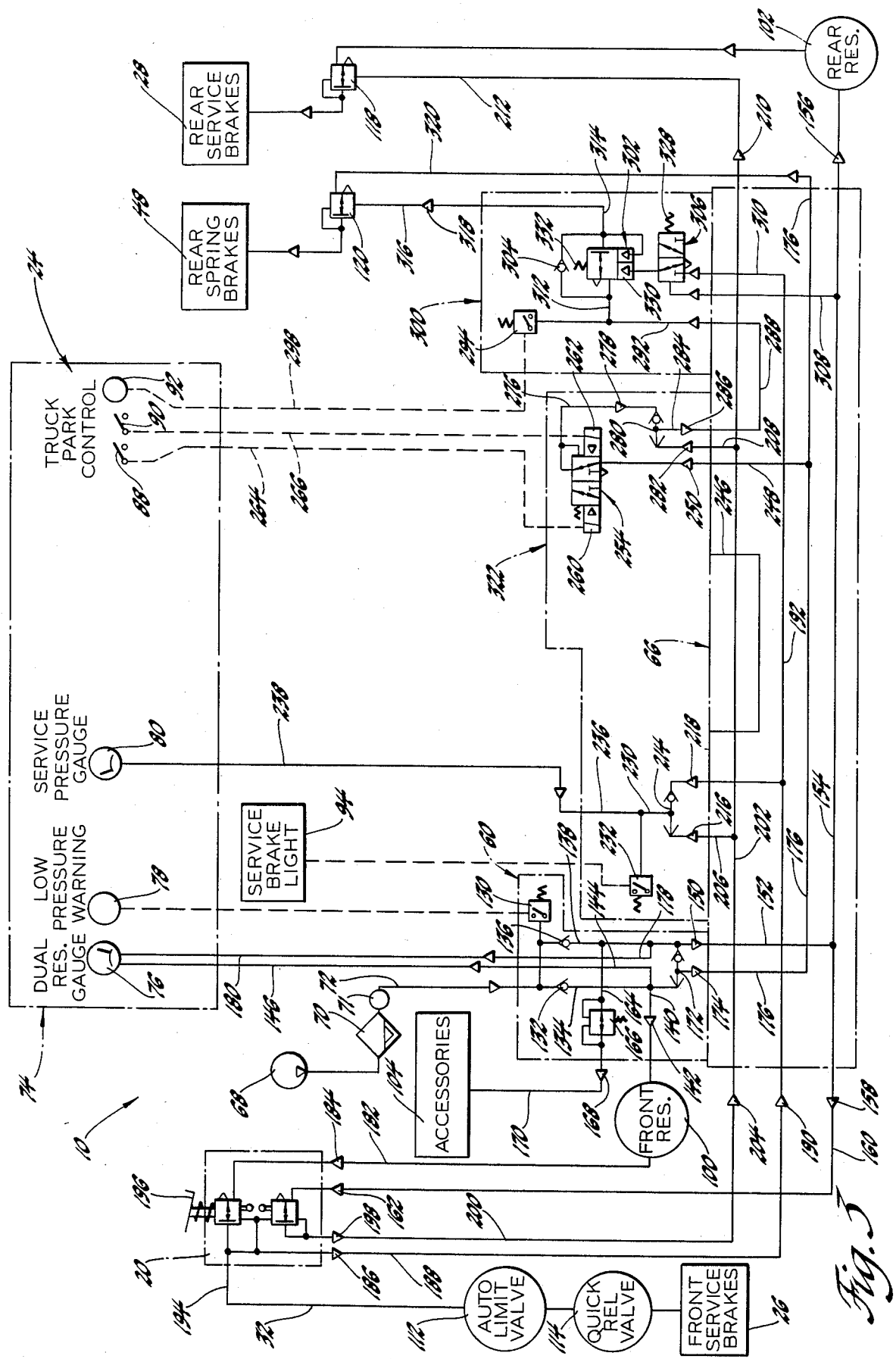
FIG. 3 is a schematic representation of the brake system embodying the invention as installed in a straight truck.
Figure 4:
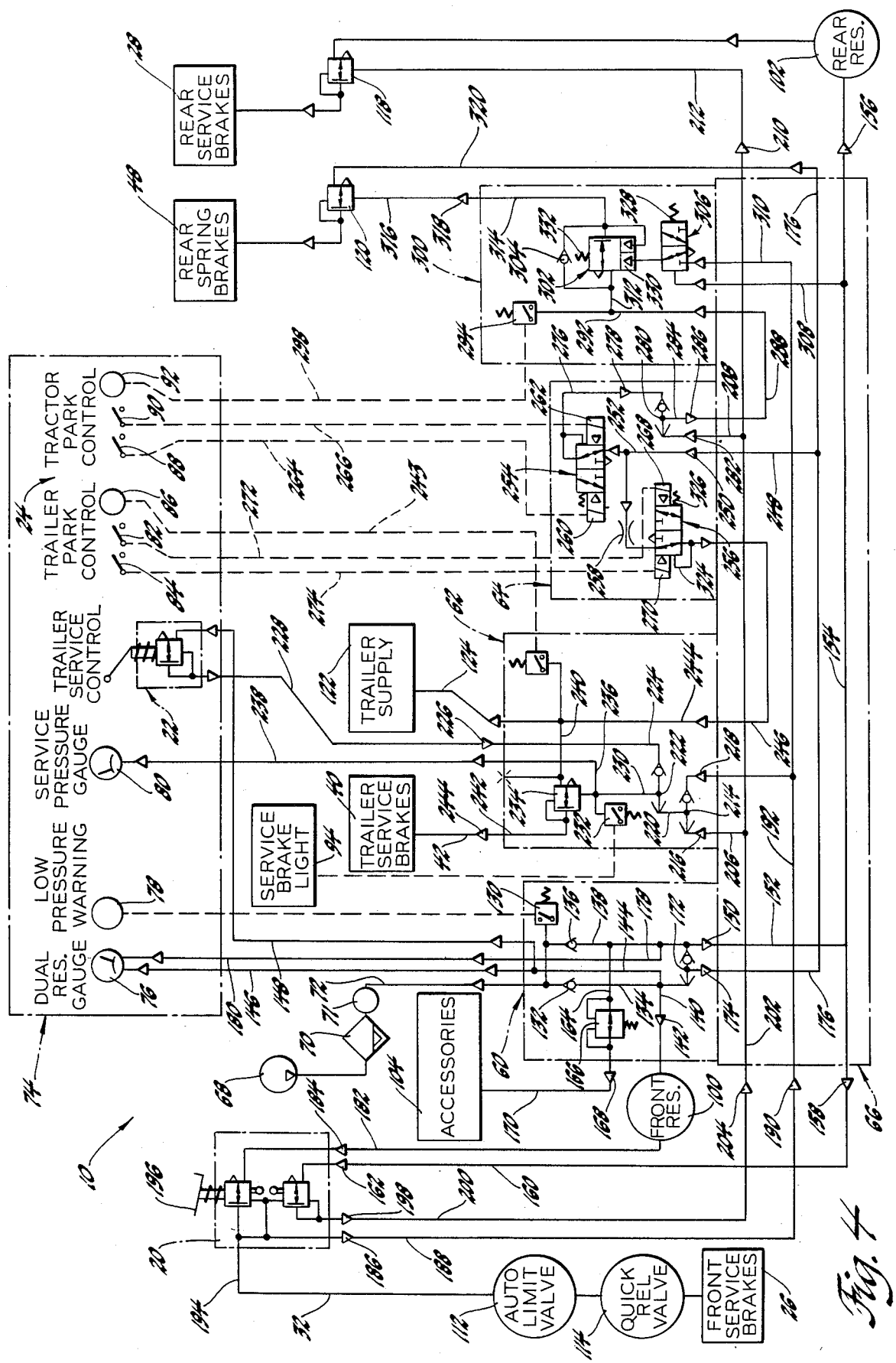
FIG. 4 is a schematic representation of the brake system embodying the invention in a truck tractor equipped to tow a trailer and including a more detailed spring brake valve module.

The system versions illustrated in FIGS. 3 and 4 include a spring brake valve module 300 which is mounted on manifold 66 in place of spring brake module 290. The spring brake valve module 300 performs several functions. It limits the air pressure used to hold off the tractor spring brakes 48. It also senses when rear reservoir pressure is lost and then uses front service air pressure to apply the tractor spring brakes proportionally. This compensates for the loss of rear service brakes due to the loss of air pressure in the rear reservoir 102. It also generates the parking brake control signal which lights indicator lamp 92 on instrument panel 74 when the parking brake system is applied.

Module 300 includes a pressure limiting valve 302 which reduces the normal service brake pressure from about 125 p.s.i. to a maximum of about 95 p.s.i. This reduced pressure is the pressure where the spring force of the balance spring 332 equals the force on the feedback pilot. Module 300 also includes a check valve 304, a pilot valve 306, and the park signal switch 294. Rear reservoir air pressure is provided to the module through manifold branch passage 308 of manifold passage 154. Front service brake actuating air pressure is provided from manifold passage 192 through the manifold branch passage 310 connected to passage 192.

The tractor rear spring brakes 48 are of the typical spring apply, pressure release type. They provide the parking brakes for the tractor portion of the truck. The tractor parking brakes are released by air pressure from the truck parking valve module 322 as transmitted to the manifold passage 288. This air pressure enters module 300 through module passage 292 and opens switch 294 to deenergize the parking brake indicator lamp 92. Air pressure from module passage 292 is also delivered to the pressure limiting valve 302 by passage 312. The reduced air pressure, at about 95 p.s.i., is then transmitted through module passage 314 and air line 316 connected thereto by connector 318 to relay valve 120. Relay valve 120 is opened by this pressure, admitting pressure to hold off the springs of the spring brakes 48. This pressure is provided through air line 320, which is connected with manifold passage 176. Manifold passage 176 is at the higher of the two reservoir pressures as described above in relation to the function of supply valve module 60.

When the park air line is evacuated in response to actuation of tractor park valve 254 to apply the parking brakes, air from the spring brakes 48 is vented at relay valve 120. Pressure in air line 316 passes through module passage 314, opening check valve 304 and passing into module passage 292. It is vented to atmosphere through valve 254. With the release of the hold off air pressure in spring brakes 48, the tractor spring brakes are now applied. Rear reservoir air pressure applied to pilot valve 306 by way of passage 308 overcomes the spring force of the pilot valve spring 328 to prevent front service air pressure from reaching the reducing valve 302 through passages 310 and 192 of manifold 66.

The truck park valve module 322 of FIG. 3 is made up of portions of the trailer valve module 62 and the park valve module 64 of FIG. 2. It has the same double check valve 214 together with its air pressure connections to manifold air passages 202 and 192, service brake light switch 232, and passage 236 leading to the service pressure gauge 80 on the instrument panel. It has the tractor park valve 254 of park valve module 64, connected in the same manner with double check valve 280 and manifold passages 208, 248 and 288. Manifold passage 246 is not used in this system version, so it is closed at either end where it opens through the upper face of the manifold toward the position wherein valve modules are mounted. The solenoids 260 and 262 of valve 254 are electrically connected with the momentary "on" switch 88 and the momentary "off" switch 90 of the tractor park control mounted on instrument panel 74. In this instance, since this is a straight truck tractor and has no trailer, the park control is labeled as the truck park control.

In any of the system's versions disclosed, should the air line 170 to the accessories 104 lose pressure, the rear reservoir 102 and passages 154, 152, 138 and 164 would be reduced in pressure. When this pressure is reduced to about 90 p.s.i., the spring force acting on the pressure protection valve 166 would overcome the pilot force acting on that valve and begin to shut it off. This will limit rear reservoir air pressure loss to a pressure level of about 90 p.s.i. Air pressure in the front reservoir 100 would stay at about 125 p.s.i. until demands on it would eventually reduce it to 90 p.s.i. The compressor 68 will then keep both reservoirs charged up to about 90 p.s.i. However, all compressor flow at pressures over 90 p.s.i. would be vented out of the open accessory line 170 since the protection valve 166 will open for any pressure supplied to it over 90 p.s.i. under these circumstances. This will leave the air pressure system operational but with reduced service capacity based on a maximum available application pressure of about 90 p.s.i. The vehicle operator will be warned of this problem because of the reduction of air pressure in the rear reservoir 102 in relation to the air pressure of the front reservoir 100 when the pressure loss initially occurs. This will be indicated by gauge 76 on the instrument panel.

Should there be a pressure loss in the front reservoir system so that the front reservoir pressure drops below the rear reservoir pressure, air received from the compressor 68 will be dumped directly out through the passage 134 and the cause of the pressure loss in the circuit containing front reservoir 100 and air line 182. This pressure will be reduced below 60 p.s.i. and will permit the low pressure warning switch 130 to close, energizing the low pressure warning lamp 78 on the instrument panel. The rear reservoir 102 is protected against air pressure loss by check valve 136. However, no air from compressor 68 will be delivered under pressure to the rear reservoir circuit, so there will be available to the vehicle operator only a limited number of brake applications before the air pressure in rear reservoir 102 is used up. The double check valve 172 protects the trailer air supply circuit 122 from failure of one of the reservoirs.

Should the pressure in the rear reservoir 102 drop for any reason such as the occurrence of a broken air line connected to it, the check valve 132 will protect the pressure in the front reservoir 100. Air will be delivered from the compressor 68 directly to the damaged rear reservoir circuit so that the front reservoir 100 can no longer be charged with air pressure. The pressure drop will permit the closure of low pressure warning switch 130 when the compressor delivery pressure falls below 60 p.s.i., and the low pressure warning lamp 78 will be energized. The air pressure in the front reservoir 100 will be available for only a limited number of brake applications. Supply pressure in manifold passage 176 and the circuits connected thereto will be protected by the double check valve 172. The pressure in the air line 170 for accessories 104 will bleed down to 90 p.s.i. and then the pressure protection valve 166 will close, holding 90 p.s.i. in line 170 until any accessories 104 are operated by that pressure.

As described above, the trailer valve module 62 of FIGS. 2 and 4 delivers service air pressure and supply air pressure to the trailer. Supply air comes directly through the module 62 from the trailer supply passage 246 in manifold 66. Service air comes from the relay valve 234 and is transmitted through module passage 242 and air line 42 to the trailer service brakes 40. Relay valve 234 is controlled by the service braking controls which control the pressure delivered to the relay valve through passage 230. Relay valve 234 isolates the trailer service air pressure from the front and rear tractor service air pressure circuits.

If any of the service air pressure controls fail to operate properly, its signal will be a lower pressure and thus will be ignored by the double check valve that it feeds. Thus if the rear service air pressure control in service application valve 20 should fail to operate, its signal would be then ignored by the double check valve 214 and the trailer service brake signal would be operated by the front service actuating pressure from service application valve 20 as delivered through air line 188 and manifold passage 192. Similarly, double check valve 214 would ignore the signal from service application valve 20 transmitted through air line 188 and manifold passage 192 if that signal should fail to operate. Double check valve 222 would ignore a signal from the trailer hand control valve 22 if that signal should fail to operate.

If the trailer brake service line 42 should become open to atmosphere, there is no effect until a service brake application is made. Because operation of the relay valve 234 would then demand unlimited supply air, the trailer supply passage 244 and the lines and passages directly connected thereto would tend to be quickly depleted of air pressure. However, the loss of the pilot pressure in passage 324 permits spring 326 to shift valve 256, closing off the air supply to the trailer service brakes.

In a truck 6 comprising a tractor 7 and a trailer 8 combination, the system configuration of FIG. 2 or FIG. 4 may be used. The park valve module 64 of FIGS. 2 and 4 is operated by two separate controls. The tractor park control on the instrument panel 74 and comprising switches 88 and 90 is one of these controls. The other is the trailer park control on instrument panel 74 and comprised of switches 82 and 84. These controls are momentary since the valves that they operate become pnuematically stable soon after shifting to a new state. This makes them insensitive to subsequent electrical power failure. The park valve module 64 was discussed above. That discussion particularly pointed out one condition of operation wherein the tractor park control is "off" and the trailer park control is "on".

It should also be noted that the trailer park valve 256 switches to the off position if the trailer supply line breaks. This occurs because the loss of trailer supply pressure supporting one end of the valve 256 through passage 324 permits the spring 326 to shift the valve to the "off" position. The restrictor or choke 258 at the inlet to the trailer park valve 256 prevents significant supply pressure loss while rapid pressure loss downstream of valve 256 in passage 246, 244, 240, and air line 124 allows the force of spring 326 to overcome the pilot force in air passage 324 and shift the valve 256 to the "off" position.

When the tractor park switch 90 has been closed to move the tractor park valve 254 to the "off" position and the trailer park switch 82 has been closed to move the trailer park valve 256 to the "off" position, supply pressure is delivered through both valves and releases the tractor and trailer parking brakes. The vehicle operator can now move the truck 6.

If the vehicle operator moves the tractor park switch 88 to the "on" position while leaving the trailer park control in the "off" position, the tractor park valve 254 is moved to its "on" position. This exhausts the park passage 314 and line 316, cutting off air pressure to the rear spring brakes 48 and therefore allowing the springs therein, which are force storage means, to apply the tractor parking brakes. The exhaustion of pressure in passage 314 also occurs in passage 292 so that switch 294 is closed and parking brake indicating lamp 92 is energized.

If in the condition described immediately above, a service brake application is made by depressing the treadle 196 with the tractor park in the "on" condition and the trailer park in the "off" condition, a compounding action on the brakes would occur if the system does not provide appropriate preventive measures. To prevent this, the double check valve 280 allows the service pressure to enter the park line and release the tractor parking brakes 48 to remove the spring force from those brakes as the service pressure increases.

With both the tractor park control and the trailer park control having been placed in the "on" position, valves 254 and 256 will exhaust air from the trailer supply line 124 and the park passage 314 and line 316, causing all of the parking brakes on the tractor 7 and the trailer 8 to be applied. This condition will also occur when the supply pressure drops to about 60 p.s.i. The 60 p.s.i. threshold pressure occurs because the valve spring forces overcome the pilot forces acting on the valves as the supply pressure drops and the valves 254 and 256 will shift to their "on" positions. Should there be insufficient air pressure in the supply system, the valves 254 and 256 will cause all of the parking brakes to be applied. A failed line leading to the rear spring brakes 48 of the tractor 7 will cause the valve 254 to move to its "on" position and apply the tractor parking brakes. A failed trailer supply line 124 will cause the valve 256 to move to "on" position and apply the trailer parking brakes.

Should the system suffer the loss of air pressure in the rear reservoir 102, the force exerted on valve 306 by the air pressure from the rear reservoir through manifold branch passage 308 will be removed and the valve spring 328 will shift valve 306 so that front service air pressure supplied through the manifold passage 310 passes through valve 306 and acts directly on the larger pilot area 330 of the reducing valve 302, turning that valve into a modulating valve. As the front service pressure increases, more force acts against the spring 332 of valve 302, lowering the pressure available at the outlet 314. This reduction in the valve delivery pressure results in an application of the tractor spring brakes 48 which is proportional to the front service pressure.

The system embodying the invention provides for full control of the air brake system of a truck 6, whether the truck be a straight truck or a combination of a tractor 7 and a trailer 8, while having a minimal amount of air lines going to the area of the tractor cab instrument panel. It will be noted that only air lines leading to and from the trailer service control valve 22, and the air lines leading to gauges 76 and 80, are required to be plumbed in the area of the instrument panel. The air lines connected to the gauges and control valve 22 may be smaller than air lines previously provided to controls on the instrument panel, thus decreasing the congestion back of the instrument panel and easing the plumbing problem. The central controller 12, which is composed of the manifold 66 and the various valve modules mounted thereon, is mounted in another appropriate location in the truck which is remote from the instrument panel and engine compartment area. For example, it may be mounted rearward of the tractor cab on an appropriate area of the tractor chassis and in a protective container. It may be mounted so that it is readily available for diagnostic testing and service without having to work in the extremely confined and limited area behind the instrument panel. The system in its several variations is readily adapted to various truck arrangements, using the same manifold 66, trailer valve module 62 and park valve module 64, spring brake module 290 or spring brake valve module 300, or park valve module 322, as appropriate. The instrument panel area is much less cluttered with air lines than heretofore. Various system components of common design such as the reservoirs, service application valve, service and parking brakes, relay valves, and instrument may be used as needed, with a simpler plumbing arrangement.

The embodiments of the invention in which an exclusive property or privilege is claimed are defined as follows:

1. In a truck having an engine compartment, a chassis, brakes actuatable by air pressure for service braking and at least some of said brakes being also actuatable by force storage means for parking brakes in response to a predetermined decrease in air pressure supplied thereto and being releasable by air pressure selectively supplied thereto, a source of air under pressure, a plurality of air pressure reservoirs normally pressurized by air pressure from said source, air pressure control means controlling air actuating pressures for said brakes, other means powered by air pressure, and a cab mounted on said chassis, said cab having truck operator's station therein and an instrument panel; a truck air brake system comprising:

an air pressure distribution manifold having air passages therein and a plurality of control modules mounted thereon and connected to appropriate ones of said manifold air passages for receiving and controlling and directing the air pressures in said manifold, said manifold and said control modules defining a central controller mounted in said truck remotely from said engine compartment and said instrument panel and readily accessible for diagnostic and servicing operations;

said instrument panel having mounted thereon air pressure gauges having air lines connecting said gauges with appropriate air passages in said central controller and indicating air pressure conditions in different portions of said system, condition indicating means electrically connected with said central controller and indicating certain conditions existing in said system, and electrical parking brake controls electrically connected with said central controller for actuating the truck parking brakes by releasing air pressure at the truck parking brakes under control of said central controller and allowing said force storage means to exert parking brake actuating forces and for releasing the truck parking brakes by supplying air pressure to the truck parking brakes under control of said central controller;

one of said control modules comprising a supply valve module receiving pressurized air from said pressure source and distributing pressurized air to said plurality of reservoirs and said other means powered by air pressure, said supply valve module including means isolating said reservoirs and said other means from each other upon pressure failure of any of said reservoirs and said other means;

another of said control modules receiving signals from at least one of said electrical parking brake controls and acting in response thereto to actuate or release the truck parking brakes, said another module having means receiving pressures from said separate ones of air pressure reservoirs and selecting the higher received pressure for parking brake release.

2. In a truck comprising a tractor and a trailer connected with and towed by the tractor, the trailer having brakes actuatable by air pressure for service braking and at least some of said trailer brakes being also actuatable by force storage means for parking brakes in response to a predetermined decrease in air pressure supplied thereto and being releasable by air pressure selectively supplied thereto, the tractor having an engine compartment, a chassis, brakes actuatable by air pressure for service braking and at least some of said tractor brakes being also actuatable by force storage means for parking brakes in response to a predetermined decrease in air pressure supplied thereto and being releasable by air pressure selectively supplied thereto, a source of air under pressure, front and rear air pressure reservoirs normally pressurized by air pressure from said source, air pressure control means controlling air actuating pressures for said brakes, other means powered by air pressure, and a cab mounted on said chassis, said cab having truck operator's station therein and an instrument panel; a truck air brake system comprising:

an air pressure distribution manifold having air passages therein and a plurality of control modules mounted thereon and connected to appropriate ones of said manifold air passages for receiving and controlling and directing the air pressures in said manifold, said manifold and said control modules defining a central controller mounted in said tractor remotely from said engine compartment and said instrument panel and readily accessible for diagnostic and servicing operations;

said instrument panel having mounted thereon air pressure gauges having air lines connecting said gauges with appropriate air passages in said central controller and indicating air pressure conditions in different portions of said system, condition indicating means electrically connected with said central controller and indicating certain conditions existing in said system, and electrical tractor and trailer parking brake controls electrically connected with said central controller for independently and selectively actuating the tractor and trailer parking brakes by releasing air pressure at the selected parking brakes under control of said central controller and allowing said force storage means to exert parking brake actuating forces and for releasing the selected parking brakes by supplying air pressure to the selected parking brakes under control of said central controller;

one of said control modules comprising a supply valve module receiving pressurized air from said pressure source and distributing pressurized air to said front and rear reservoirs and said other means powered by air pressure, said supply valve module including means isolating said reservoirs and said other means from each other upon pressure failure of any of said reservoirs and said other means, said supply valve module having means receiving pressures from said front and rear air pressure reservoirs and selecting the higher received pressure for trailer brake supply pressure for actuation of the trailer service brakes;

another of said control modules comprising a parking brake valve module receiving signals from one of said electrical parking brake controls and acting selectively in response thereto to direct parking brake release pressure to the tractor parking brakes to release the tractor parking brakes by releasing the parking brake release pressure from the tractor parking brakes to permit application of the tractor parking brakes by said force storage means, said another module having means receiving pressures from said front and rear air pressure reservoirs and selecting the higher received pressure for parking brake release.

3. In a vehicle having an engine compartment, a cab for the vehicle operator with an instrument panel therein, and a plurality of air sub-systems including air operated accessory and brake sub-systems, and more particularly including vehicle air supply systems, vehicle service brakes and vehicle parking brakes operated by pressurized air and having control valves for distributing and controlling the pressures in the sub-systems, said control valves including a service brake application valve adapted for operation under control of the foot of the vehicle operator, an air pressure supply control valve establishing and controlling the supply air pressures for the air operated accessory and brake sub-systems, and a park control valve under control of the vehicle operator to release and apply vehicle parking brakes, the improved vehicle air brake system comprising:

a central controller including a manifold with air passages provided therein, said air pressure supply control valve and said park control valve being mounted on said manifold and having appropriate air passages connected with appropriate air passages in said manifold for receiving and sending pressurized air therethrough, said vehicle air supply systems and said vehicle service brakes and said vehicle parking brakes being connected with appropriate air passages of said manifold via air lines, said service brake application valve being connected via air lines to the vehicle front service brakes and to appropriate air passages of said manifold via air lines;

said central controller being mounted on said vehicle remotely from said engine compartment and said instrument panel, said park control valve having electrical controls mounted on the instrument panel and electrically connected to said park control valve mounted on said manifold, whereby said instrument panel has space behind and on it normally crowded with air lines and control valves but available for mounting other devices requiring a benign environment with temperature and contaminant limits normally within the comfort range provided in the cab for the vehicle operator, and said central controller being readily accessible for diagnostics and servicing.

* * * * *